(12) United States Patent
Mehta et al.

(10) Patent No.: US 11,375,111 B2
(45) Date of Patent: Jun. 28, 2022

(54) METHOD FOR ACQUIRING IMAGES HAVING UNIDIRECTIONAL DISTORTION FROM AN AERIAL VEHICLE FOR 3D IMAGE RECONSTRUCTION

(71) Applicant: ideaForge Technology Pvt. Ltd., Maharashtra (IN)

(72) Inventors: Ankit Mehta, Maharashtra (IN); Rahul Singh, Maharashtra (IN); Ashish Bhat, Maharashtra (IN)

(73) Assignee: ideaForge Technology Pvt. Ltd., Maharashtra (IN)

( * ) Notice: Subject to any disclaimer, the term of this patent is extended or adjusted under 35 U.S.C. 154(b) by 0 days.

(21) Appl. No.: 16/768,244

(22) PCT Filed: Nov. 30, 2018

(86) PCT No.: PCT/IB2018/059512
§ 371 (c)(1),
(2) Date: May 29, 2020

(87) PCT Pub. No.: WO2019/106623
PCT Pub. Date: Jun. 6, 2019

(65) Prior Publication Data
US 2021/0195103 A1 Jun. 24, 2021

(30) Foreign Application Priority Data
Nov. 30, 2017 (IN) .............................. 201721043086

(51) Int. Cl.
*H04N 5/232* (2006.01)
*G06T 7/55* (2017.01)
(Continued)

(52) U.S. Cl.
CPC ....... *H04N 5/23238* (2013.01); *B64C 39/024* (2013.01); *B64D 47/08* (2013.01);
(Continued)

(58) Field of Classification Search
CPC .......... H04N 5/23238; H04N 5/23299; B64D 47/08; G06T 7/55; G06T 2207/10032;
(Continued)

(56) References Cited

U.S. PATENT DOCUMENTS

| 8,687,062 B1 | 4/2014 | Reece |
| 9,179,064 B1 | 11/2015 | McClatchie et al. |

(Continued)

FOREIGN PATENT DOCUMENTS

| CN | 105629980 A | 6/2016 |
| CN | 106296816 A | 1/2017 |

OTHER PUBLICATIONS

PCT International Search Report and Written Opinion for International Application No. PCT/IB2018/059512, entitled "Method For Acquiring Images Having Unidirectional Distortion From An Aerial Vehicle For 3d Image Reconstruction," dated Mar. 8, 2019.

(Continued)

*Primary Examiner* — Nasim N Nirjhar
(74) *Attorney, Agent, or Firm* — Hamilton, Brook, Smith & Reynolds, P.C.

(57) ABSTRACT

A method for capturing images of large target area using a single low FOV high resolution camera mounted on an Aerial Vehicle for 3D reconstruction is disclosed. The camera captures sets of images consisting of a nadir image a plurality of oblique images at predefined waypoints or as the Aerial Vehicle travels along a flight path. Oblique images are captured in two perpendicular directions by tilting camera about a single tilt axis at one time thereby preventing bidirectional distortion of objects in images. Further, first direction and second direction define a quadrant of area below the Aerial Vehicle. Oblique images along two perpendicular directions are captured either by using roll and pitch axes, or by using a single tilt axis and a pan axis of (Continued)

camera control mechanism wherein using pan axis the single tilt axis is reoriented in a perpendicular orientation to capture oblique images in perpendicular direction.

8 Claims, 12 Drawing Sheets

(51) Int. Cl.
  *B64C 39/02* (2006.01)
  *B64D 47/08* (2006.01)
(52) U.S. Cl.
  CPC ........... *G06T 7/55* (2017.01); *H04N 5/23299* (2018.08); *B64C 2201/123* (2013.01); *B64C 2201/127* (2013.01); *G06T 2207/10032* (2013.01)
(58) Field of Classification Search
  CPC ............ B64C 39/024; B64C 2201/127; B64C 2201/123
  See application file for complete search history.

(56) References Cited

U.S. PATENT DOCUMENTS

| | | | |
|---|---|---|---|
| 2004/0173726 A1* | 9/2004 | Mercadal | F16M 11/12 248/660 |
| 2016/0239976 A1* | 8/2016 | Fathi | G06T 7/579 |
| 2018/0316858 A1* | 11/2018 | Matsumoto | H04N 5/23212 |
| 2019/0130630 A1* | 5/2019 | Ackerson | G06T 9/40 |
| 2020/0027243 A1* | 1/2020 | Ziegler | G06T 7/85 |
| 2020/0221056 A1* | 7/2020 | Cao | H04N 7/183 |

OTHER PUBLICATIONS

PCT International Preliminary Report on Patentability for International Application No. PCT/IB2018/059512, entitled "Method For Acquiring Images Having Unidirectional Distortion From An Aerial Vehicle For 3d Image Reconstruction," dated Jun. 11, 2020.

* cited by examiner

METHOD FOR ACQUIRING IMAGES HAVING UNIDIRECTIONAL DISTORTION FROM AN AERIAL VEHICLE FOR 3D IMAGE RECONSTRUCTION

This application is the U.S. National Stage of International Application No. PCT/IB2018/059512, filed Nov. 30, 2018, which designates the U.S., published in English, and claims priority under 35 U.S.C. § 119 or 365(c) to Indian Application No. 201721043086, filed Nov. 30, 2017. The entire teachings of the above applications are incorporated herein by reference.

TECHNICAL FIELD

The present disclosure relates to field of optical imaging. In particular, it pertains to a method for acquiring images from an Aerial Vehicle for reconstructing high-resolution 3D images.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Aerial imagery finds application in fields such as aerial reconnaissance, mapping, disaster mitigation measures etc. In aerial reconnaissance, it is frequently desired to have a series of photographs of a terrain of interest taken by an electro-optical camera installed in a moving platform such as an Aerial Vehicle. This is of particular importance for military applications in which it is not sufficient to just provide an image of the target itself, but imagery of the surrounding terrain as well is required.

Military surveillance missions, often use autonomous vehicles, such as Unmanned Aerial Vehicles (UAVs) for reconnaissance and intelligence-gathering missions. The UAVs have the capability to undertake a short low altitude flight and use on-board camera systems to acquire images, which are in turn delivered to a ground station which is monitoring their flight.

Aerial imagery requires mounting cameras on an aerial platform for capturing photographs of landmass over large areas. It requires capturing nadir images and oblique/slanted images. Slanted images are required to meet specific purposes in military, civil engineering, agriculture, spying, real estate, and other applications where 3D mapping of the terrain is of importance. Nadir images are photographed using a camera that faces straight down, whereas oblique images are generated using cameras that are oriented at an angle to the ground. Aerial photographs are often combined and are generally presented in the form of an image mosaic by stitching several photographs that are taken with one or more cameras.

For small UAV's, the cameras are typically implemented with fixed mount systems because of the size, weight, and power restrictions that prevent use of gimbaled systems. With a fixed mount camera, the UAV must stay airborne longer to retrieve the same data as compared to a platform with a gimbaled system.

Also, the wide-angled field of view used to map geographical targets from light-weight UAVs provide low resolution images having lesser pixels per image, resulting in blurred and grainy images. Although the wide-angled approach could cover a larger area in a single shot but the resulting image quality deterioration is an important factor that makes it undesirable.

The existing methods that are currently available for performing aerial imagery on board an unmanned aerial vehicle are limited in their scope with respect to the kind of perspectives that can be achieved by using a single camera, while keeping parameters such as UAV path and UAV speed constant.

Because of these constraints, the present-day reconnaissance missions for small UAVs are limited to providing only narrow, non-zoom field-of-view (FOV) images with insufficient ground area coverage. Moreover, longer flight times are required to complete reconnaissance, surveillance, and other mission objectives typically assigned to small UAVs.

Prior art references have dealt with problem of capturing images of land mass over large areas. For example, U.S. Pat. No. 8,687,062B1 discloses an aerial camera system comprising: a camera cluster, including a plurality of cameras, each camera orientated in a direction selected from a plurality of different directions. It further incorporates one or more rotators that rotate the camera cluster about respective one or more axes in response to one or more signals from a control module. The cited reference also discloses a method of controlling the disclosed camera cluster to capture images, which involves rotation of the camera cluster about a vertical axis (i.e. pan axis) and a horizontal axis. The disclosed camera system and method of capturing images requires a plurality of cameras increasing the weight of the camera system which is not a feasible solution for an aerial platform like UAV.

Another reference, U.S. Pat. No. 9,179,064 B1 discloses a method for capturing image data using at least one camera-group with at least one optical axis nominally rotated by a predetermined oblique plan angle relative to a nominal axis of travel to achieve a corresponding predetermined swath width greater than achieved by operating the at least one optical axis nominally parallel to the nominal axis of travel. In particular the patent references teaches rotating of electronic image sensor around the optical axis of a camera so that projected linear sets of pixel elements of the electronic image sensor are aligned to nominal axis of travel. As can be seen, the cited reference also requires a plurality of cameras increasing the weight of the camera system.

Therefore, there is a need in the art to present a method that not only provides better resolution and field of view for imaging applications during the flight path of the UAV but also provides optimum overlapping of captured images to ensure maximum coverage of the ground area and capturing the same in the resultant stitched image for high quality 3D image construction with a single camera.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

OBJECTIVE OF THE INVENTION

An object of the present disclosure is to provide an economical and simple to implement method for acquiring high-resolution three-dimensional images of large target area from an aerial platform.

Another object of the present disclosure is to provide a method for acquiring high-resolution three-dimensional images of large target area from an aerial platform using a single camera.

Another object of the present disclosure is to provide a method for acquiring images of large target area with a single camera by moving the camera about any two axes i.e. a combination of pan axis and a tilt axis, or a combination of roll axis and pitch axis of camera control mechanism.

Yet another object of the present disclosure is to provide a method for capturing oblique images that results in a unidirectional distortion of objects thereby minimizing inverse transformation of the captured images in oblique perspective.

Yet another object of the present disclosure is to provide a method for capturing oblique images that requires capturing fewer images.

Still another object of the present disclosure is to ensure overlap between images using a multi paradigm numerical computing environment such as Matlab.

SUMMARY

Aspects of the present disclosure relate to a method for capturing images of a large target area using a single camera mounted on an aerial platform so that the captured images may be used for reconstructing 3D image of the targeted area. In an aspect, the disclosed method enables use of a high resolution, narrow field of view camera enabling preparation of high resolution, 3D images of large area of interest. In particular, use of a single camera makes the image capturing apparatus light and suitable for Unmanned Aerial Vehicles that have low load carrying capacity.

In an aspect, the disclosed method for capturing plurality of images of a large targeted area for 3D reconstruction involves moving a single camera so as to aim it in different directions, and thereafter capturing images to cover a large area of interest, wherein the captured images can be processed and stitched together to reconstruct high resolution 3D image of the large area of interest. Thus, the disclosed method overcomes trade-off between resolution and field of view that presently has to be made while carrying out aerial photography using a single camera.

In an exemplary embodiment, the disclosed method uses a single camera that is configured to capture images in a step-stare manner in which a single image is captured first that is followed by another image after rotation about one or more axes by fixed angles. By continuing this process, a sequence of overlapping images is taken looking straight down, called an orthographic or nadir perspective, as well as in directions looking down at an angle below horizon but not straight down, called an oblique perspective, wherein the images captured in oblique perspective (referred to as oblique imagery) provide 3D perspective of the area of interest.

In an aspect, the disclosed method comprises steps of: (a) capturing an image of area down below in nadir perspective after pointing optical axis of the camera vertically down; (b) capturing a plurality of overlapping images in oblique perspective along a first direction; and (c) capturing, starting from the optical axis of the camera in nadir position, a plurality of overlapping images in oblique perspective along a second direction. In an aspect, the second direction is perpendicular to the first direction, and the first direction and the second direction define a quadrant of area below the Aerial Vehicle.

Thus, the disclosed method requires taking reduced number of images, thereby reducing post-processing work.

In an embodiment, first direction and second direction can be nose to tail direction and wing span direction of an Aerial Vehicle, and the plurality of oblique images in oblique perspective along the first direction and the second direction can be obtained by tilting the camera about roll axis and tilt axis of control mechanism of the camera (referred to as camera control mechanism).

In an alternate embodiment, the plurality of oblique images in oblique perspective along the first direction and the second direction can be obtained by tilting the camera about a tilt axis after the tilt axis has been oriented along pitch or roll axis of the Aerial Vehicle by pan action, and thereafter reorienting the tilt axis in perpendicular direction by moving the camera about pan axis of the camera control mechanism.

In an aspect, the disclosed method involves moving the camera and capturing images so that irrespective of combination of axes chosen, distortions are limited to unidirectional skewing of the original shape of the object in the image. Thus, the disclosed method requires only a unidirectional inverse transformation before reconstructing the 3D image thereby simplifying image processing.

In an embodiment, set of images can be captured while Aerial Vehicle is hovering at a waypoint out of plurality of waypoints along a flight path.

In an embodiment, while capturing set of images by hovering at a waypoint a single tilt axis can be reoriented in direction perpendicular to first axis by yaw movement of the Aerial Vehicle without panning of the camera, thereby eliminating need of a pan axis in camera control mechanism.

In an aspect, the camera can tilt about the roll and pitch axes in opposite directions at alternate waypoints.

In an alternate embodiment, it is possible to implement the disclosed method for capturing set of images while the Aerial Vehicle is moving along a flight path, in which case, the camera movement can be controlled using a multi paradigm numerical computing environment to ensure adequate overlap of the captured images.

Various objects, features, aspects and advantages of the present disclosure will become more apparent from the following detailed description of preferred d embodiments, along with the accompanying drawing figures in which like numerals represent like features.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

DETAILED DESCRIPTION

Figure 1A:
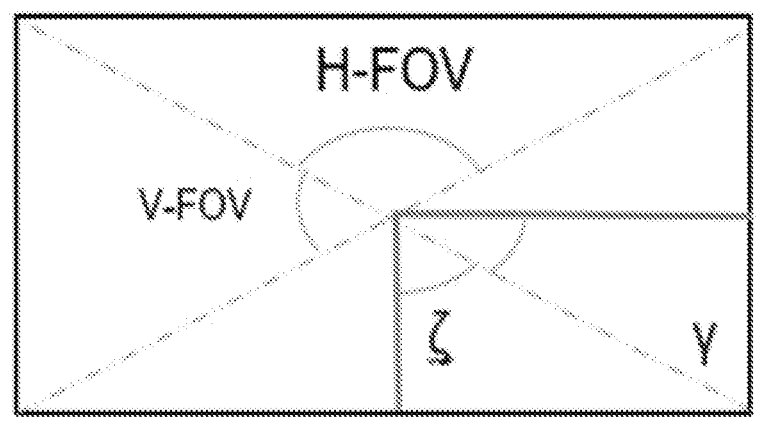
FIGS. 1A and 1B illustrate a rectangular ground area covered by a camera from a fixed point in 3D space with its optical axis oriented vertically down.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein as shown below. To the extent a term used in a claim is not defined, it should be given the broadest definition persons in the pertinent art have given that term as reflected in printed publications and issued patents at the time of filing.

Term 'yaw' as used herein refers to aside to side movement of the nose or rotation or heading of an Aerial Vehicle about a vertical axis. Accordingly term 'yaw axis' refers to a vertical line passing through CG of the AV.

Term 'pitch' as used herein refers to up and down movement of nose of an Aerial Vehicle. Accordingly term 'pitch axis' refers to a horizontal line along wing span passing through CG of the AV.

Term 'roll' as used herein refers to angular movement of an Aerial Vehicle along a longitudinal axis passing through the AV from nose to tail. Accordingly, term 'roll axis' refers to a longitudinal line from nose to tail, and through CG of the AV. In the present disclosure it has been presumed that flight direction is same as direction of the roll axis and both of them have been used interchangeably. Likewise, it has been presumed that flight perpendicular direction is same as direction of the pitch axis and both of them have been used interchangeably.

Term 'optical axis' as used herein with reference to a camera refers to path along which light travels from ground at the center of the field of view of the camera to arrive at the entrance to the camera.

Term 'nadir perspective' or "orthogonal perspective' as used herein refers to a camera perspective looking vertically down, i.e. when optical axis of the camera is vertically oriented.

Term 'oblique perspective' or 'oblique view' as used herein refers to camera perspective looking down at an angle below the horizon but not straight down, i.e. optical axis of the camera is pointing below the horizon but not vertically down. Accordingly term 'oblique angle' refer to angle that the optical axis of the camera makes during an oblique perspective with vertical (further explained in subsequent paragraph).

Term 'tilt' as used herein refers to movement of camera about a horizontal axis. In particular, the camera can be tilted to look vertically down for a nadir perspective or at an angle below horizon but not vertically down to get an oblique perspective. A position of the camera looking along horizon shall be having a 0/180 degrees tilt, and a camera tilted to look vertically down for a nadir perspective shall be having a 90 degrees tilt. Accordingly, for an oblique perspective the camera shall have a tilt less or more than 90 degrees. In the present disclosure, camera can tilt to positions from 0 degrees to 180 degrees, wherein tilt of less than 90 degrees enables it to take oblique perspective in forward direction, and a tilt beyond 90 degrees enables it to take oblique perspective in backward direction.

Term 'tilt axis' as used herein refers to a horizontally oriented axis about which camera can rotate for tilt movement. The tilt axis can take a position along yaw axis or pitch axis, or anywhere in between. There may be two tilt axes such as roll axis aligned along roll axis of the Aerial Vehicle and Pitch axis aligned along pitch axis of the Aerial Vehicle. Therefore, at times, movement of camera along a tilt axis oriented along pitch axis may also be referred to as movement along pitch axis or pitch movement, and movement of camera along a tilt axis oriented along roll axis may also be referred to as movement along roll axis or roll movement.

Term 'oblique angle' as used herein refers to angle made by optical axis of camera with vertical/nadir perspective during an oblique perspective. Specifically, when an oblique perspective is achieved by combination of camera movement about two tilt axes, oblique angle may have two components, e.g. oblique angle about roll axis and oblique angle about pitch axis, and the two components together making the net oblique angle. On the other hand when oblique perspective is achieved by combination of camera movement about pan axis (defined below) and a tilt axis, the oblique angle shall be (180–tilt angle) or (tilt angle –180) depending on if the tilt is less than or more than 180 degrees.

Term 'plan angle' as used herein refers to angle between nose to tail direction, i.e. roll axis of Aerial Vehicle, and the emerging optical axis of the camera projected onto the ground plane. The plan angle can take values from –180 degrees to +180 degrees. The plan angle may be achieved by pan movement (defined below) of the camera. Alternatively, it may be achieved by a combination of camera movement about two tilt axes.

Term 'pan' or 'pan movement' as used herein refers to rotation/movement of camera about a vertical axis, and accordingly term 'pan axis' refers to a vertically oriented axis for camera movement. As can be understood, the pan axis shall be parallel to yaw axis of aerial vehicle, and therefore, at times pan movement of camera may also be referred to as movement along yaw axis or yaw movement. Further, pan angle is not to be confused with plan angle. At times such as when tilt angle of the camera is less than 90 degrees, the two angles may be same. However, a combination of a tilt angle that is more than 90 degrees with a pan angle between –90 degrees and +90 degrees shall result in a plan angle that is more than 90 degrees.

Embodiments explained herein pertain to a method for capturing images of a large target area of interest using a single high resolution, narrow field of view camera mounted on an aerial platform so that the captured images may be used for reconstructing 3D image of the targeted area. In particular, use of a single camera makes the image capturing apparatus light and suitable for Unmanned Aerial Vehicles that have low load carrying capacity.

In an embodiment, the disclosed method for capturing plurality of images of a large targeted area for 3D reconstruction involves moving a single camera so as to aim it in different directions, and thereafter capturing images to cover a large area of interest, wherein the captured images can be processed and stitched together to reconstruct high resolution 3D image of the large area of interest. Thus, the disclosed method overcomes trade-off between resolution and field of view that presently has to be made while carrying out aerial photography using a single camera. Simultaneously, it also requires fewer numbers of images to be captured.

In an exemplary embodiment, the disclosed method uses a single camera that is configured to capture images in a step-stare manner in which capturing of each image is followed by rotation about one or more axes by fixed angles before capturing next image. By continuing this process, a sequence of overlapping images is taken in different perspectives such as nadir perspective and in oblique perspectives for area around the nadir perspective, wherein the oblique imagery provides 3D perspective of the area of interest.

In an aspect, the disclosed method involves moving a single camera about only two axes, wherein the two axes can be a combination of two tilt axes along roll axis and pitch axis of the Aerial Vehicle (hereinafter referred to as roll axis and pitch axis of control mechanism of the camera), or a combination of a horizontally disposed tilt axis and a vertically disposed pan axis of control mechanism of the camera (alternatively referred to as camera control mechanism). Moving the camera about any of these two combinations in a defined manner enables capturing of images in different perspective that can be used for 3D image construction.

In another aspect, directions in which set of images in nadir and oblique perspective are taken define a quadrant of area below the Aerial Vehicle, thereby reducing number of images that are required to be captured.

In an aspect, the disclosed method involves moving camera and capturing images so that irrespective of combination of axes chosen, distortions are limited to unidirectional skewing of the original shape of the object in the image. Thus, the disclosed method requires only a unidirectional inverse transformation before reconstructing the 3D image thereby simplifying image processing.

In an aspect, oblique images can be captured along flight direction, i.e. nose to tail direction by tilting the camera from its nadir position about pitch axis, and along wingspan direction of the AV by tilting the camera from nadir position about roll axis.

In an alternate embodiment, two axes of camera control mechanism can be vertically oriented pan axis and a horizontally oriented tilt axis, wherein the camera control mechanism is configured such that panning the camera results in change in orientation of the horizontally oriented tilt axis so that it can be aligned along flight direction (i.e.

nose to tail direction/roll axis of the Aerial Vehicle) to work as roll axis, or along direction perpendicular to the flight direction (i.e. wingspan direction/pitch axis of the AV) to work as pitch axis, or any other direction in between depending on requirement. Oblique images can be captured along flight direction, i.e. nose to tail direction by first orienting the tilt axis along wingspan direction/pitch axis of the AV by moving the camera control mechanism about the pan axis, and thereafter tilting the camera about the tilt axis. Likewise, oblique images along the wingspan direction of the AV can be captured by reorienting the tilt axis along nose to tail direction/roll axis of the AV by moving the camera control mechanism about the pan axis and thereafter tilting the camera along the tilt axis.

In an embodiment, images can be captured using an Aerial Vehicle capable of hovering, and a set of images in nadir and oblique perspectives, as outlined above, can be captured at each of the plurality of predefined way points along flight path of the Aerial Vehicle so that sets of captured images overlap along the flight path.

In an alternative embodiment, set of images in nadir and oblique perspectives can be captured as the Aerial Vehicle is moving along its flight path, wherein speed of capturing images can be coordinated with speed of the Aerial Vehicle such that sequentially captured sets of images overlap with each other to provide full coverage of area of interest. In another aspect, the Aerial vehicle can be flown along spaced apart parallel paths and sets of images in nadir and oblique perspectives captured along each of these paths, wherein spacing between the parallel path can be such that the sets of captured images along two adjacent paths overlap in lateral direction.

Figure 1B:
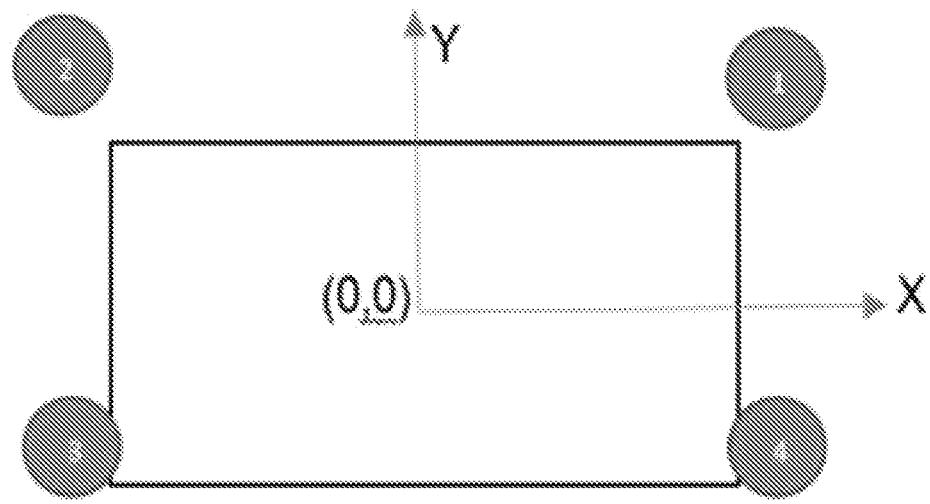

Referring to FIGS. 1A and 1B Field of View (FOV) of a camera is usually defined by angles for the horizontal or vertical component of the FOV. A larger angle translates to a larger field of view, though the resulting image would be highly pixelated. For imaging a large area using a camera with h a smaller field of view, from a fixed point in 3D space (x,y,z) wherein z is the altitude of the UAV, the point in 3D space can be assumed to have coordinates (0,0,10) where the UAV is flying at an altitude of 10 m. The angle of view can be measured horizontally, vertically or diagonally. Horizontal FOV (H.FOV), denoted by $\zeta$ (Zeta) can be calculated using following equation:

$$\zeta = \frac{1}{2} \qquad \text{(Horizontal FOV)}$$

Likewise Vertical FOV (V.FOV), denoted by $\gamma$ can be calculated as:

$$\gamma = \frac{1}{2} \qquad \text{(Vertical FOV)}$$

Ground area covered by camera with nadir perspective shall be a rectangle (assuming that H.FOV and V.FOV are different) as shown in FIG. 1B. Coordinates of the rectangle (ground area covered by camera) shall be given by:

$$(X1, Y1) = \frac{h\tan(\gamma)}{\cos(\zeta)}, \frac{h\tan(\zeta)}{\cos(\gamma)},$$

$$(X2, Y2) = \frac{h\tan(\gamma)}{\cos(-\zeta)}, \frac{h\tan(-\zeta)}{\cos(\gamma)}$$

$$(X3, Y3) = \frac{h\tan(-\gamma)}{\cos(-\zeta)}, \frac{h\tan(-\zeta)}{\cos(-\gamma)}$$

$$(X4, Y4) = \frac{h\tan(-\gamma)}{\cos(\zeta)}, \frac{h\tan(\zeta)}{\cos(-\gamma)}$$

With above coordinates, camera will cover a ground area given by:

$$AG = \frac{4h \cdot \tan\gamma}{\cos\zeta} \cdot \frac{h\tan\zeta}{\cos\gamma} \qquad \text{Eq (1)}$$

For mapping a ground area Ad=length*breadth, $$Ad = 4h^2(\tan \zeta_d/\cos \gamma_d)(\tan \gamma_d/\cos \zeta_d) \qquad \text{Eq (2)}$$

Using length and breadth information from Eq. 1 and Eq. 2 the following equations can be deduced, Length=$2h(\tan \zeta_d/\cos \gamma_d)$ Breadth=$2h(\tan \gamma_d/\cos \zeta_d)$ Solving for the unknowns $\zeta_d$ and $\zeta_d$ we can compute the desired global FOV as:

Desired horizontal global FOV=$2\zeta_d$

Desired vertical global FOV=$2\gamma_d$

In practice the desired area/rectangle can be easily obtained by the mapping GNSS coordinates provided by the user. Eq. (1) and (2) become undefined at $\zeta_d$ or $\gamma_d$=90°. However, since the camera of the invention has a narrow FOV for low oblique aerial photography, the equations will hold true for all intents and purposes.

Having described and defined area of image captured by a camera mounted on an aerial platform, various possible ways of moving/rotating the camera to capture overlapping images of nadir perspective and oblique perspective of surrounding area are discussed below along with explanations how the ground area covered by the camera changes under different conditions. The understanding helps in arriving at an optimum methodology for moving the camera to cover a large area of interest.

In order to direct optical axis of the camera in different directions, a camera control mechanism may tilt or rotate the camera along different axes. For example, the camera can tilt about roll axis and pitch axis, and combination of tilt about these two axes can enable the optical axis of the camera to be directed in any direction i.e. to get oblique perspective at different oblique angles and plan angles, in addition to nadir perspective.

In an alternate configuration, camera control mechanism can tilt the camera about a single tilt axis and can have capability to rotate/pan about a vertically oriented pan axis, wherein the camera control mechanism is configured such that panning the camera results in change in orientation of the horizontally oriented tilt axis so that it can be aligned along flight direction (i.e. nose to tail direction/roll axis of the Aerial Vehicle) or along direction perpendicular to the flight direction (i.e. wingspan direction/yaw axis of the AV) or any other direction in between depending on requirement. Combination of rotation of the camera about these two axes can also enable the optical axis of the camera to be directed in any direction i.e. to get oblique perspective at different oblique angles and plan angles in addition to nadir perspective.

However, ground area in captured images under oblique perspective shall differ under the different methods of camera movements. To understand the difference, let us consider following conditions:

Camera movement purely along a single tilt axis;
Camera movement in combination of rotation about two tilt axes; and Camera movement in combination of rotation about pan axis and a single tilt axis.

Case 1: Camera Movement Purely Along a Single Tilt Axis

Figure 2:
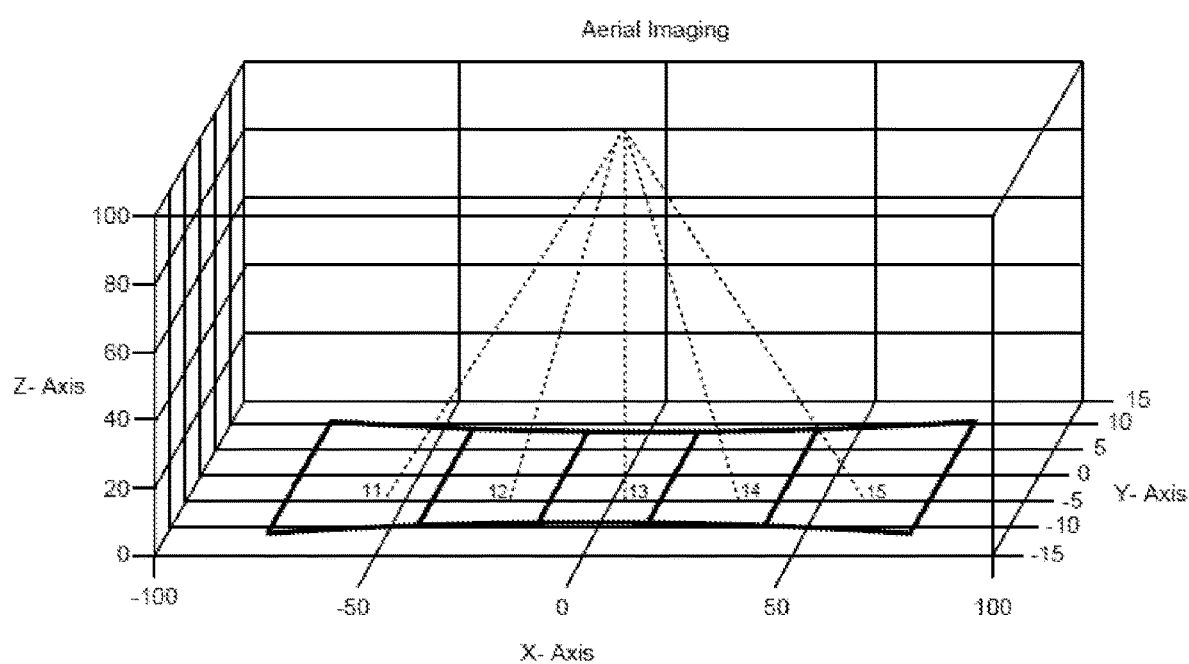
FIG. 2 illustrates ground area covered by a camera when the camera is tilted about a single tilt axis.

If camera undergoes tilt about a single tilt axis that may be aligned along roll axis or pitch axis or any direction in between, then area covered by the camera shall represented by a distorted rectangles 11, 12, 13 and 14 as shown in FIG. 2. As shown, the rectangle shall distort to a trapezoid (for low oblique views) and amount of distortion shall depend onoblique angle (i.e. angle made by optical axis of the camera with vertical/nadir perspective). Accordingly, area covered by the camera will also change.

Coordinates of a trapezoid, such as trapezoids 11. 12. 13 and 14 shall be:

$(X1,Y1)=h\tan(\gamma)\sec(\Phi+\zeta), h\tan(\Phi+\zeta)\sec(\gamma)$ $(X2,Y2)=h\tan(\gamma)\sec(\Phi-\zeta), h\tan(\Phi-\zeta)\sec(\gamma)$ $(X3,Y3)=h\tan(-\gamma)\sec(\Phi-\zeta), h\tan(\Phi-\zeta)\sec(-\gamma)$ $(X4,Y4)=h\tan(-\gamma)\sec(\Phi+\zeta) h\tan(\Phi+\zeta)\sec(-\gamma)$ where $\Phi$ is oblique angle about the corresponding tilt axis. Using these vertices ground area (trapezoid) covered by the camera can be computed at different oblique angles ($\Phi$). The equations are omitted here for brevity.

Notably, when images in oblique perspective are taken by tilting camera about a single tilt axis, images can be captured only in one direction controlled by orientation of the tilt axis. For example, if the tilt axis is oriented along roll axis/nose to tail direction, the oblique images can be taken only along wingspan direction. Likewise, if the tilt axis is oriented along pitch axis/wingspan direction, the oblique images can be taken only along roll axis/nose to tail direction. However, changing the orientation of the tilt axis can provide flexibility to cover any direction as would be discussed in case 3 below.

Figure 3:
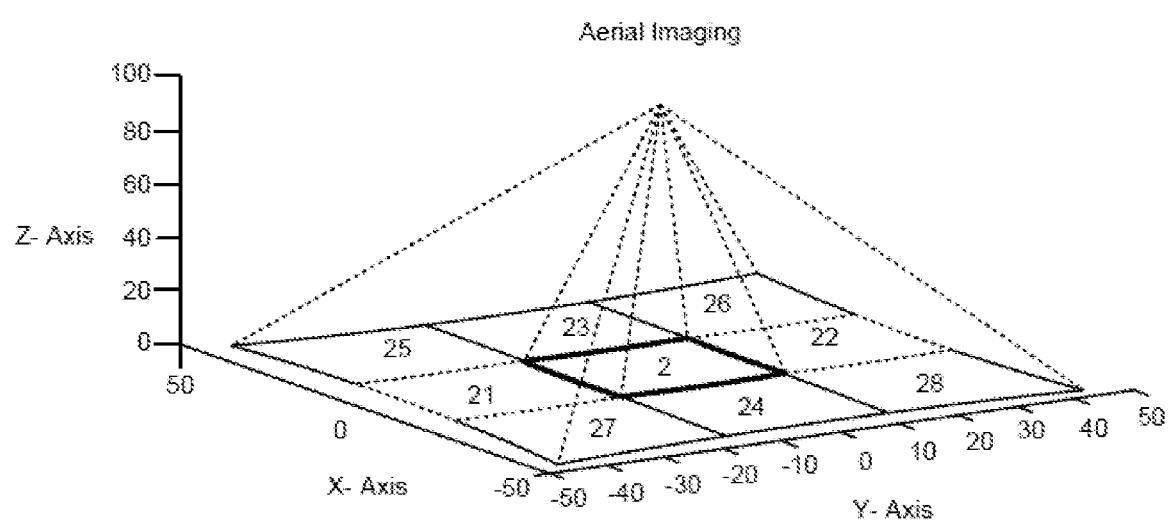
FIG. 3 illustrates ground area covered by a camera by tiltingin combination of movement about roll axis and pitch axis.

Case 2: Camera movement in combination of tilt/rotation about two tilt axes:

When camera captures image after undergoing tilt/rotation about both of roll axis and pitch axis, the ground area covered by the camera changes according to motion in both directions. In this case, rectangle of nadir view and trapezoids 21/22 and 23/24 of pure tilt about roll axis and pitch axis respectively, shall will distort to become polygons, such as polygons 25, 26, 27 and 28 as shown in FIG. 3.

The coordinates of a polygon such as polygon 25, 26, 17 and 28 shall be:

$(X1,Y1)=h\tan(\theta+\gamma)\sec(\Phi+\zeta), h\tan(\Phi+\zeta)\sec(\theta+\gamma)$ $(X2,Y2)=h\tan(\theta+\gamma)\sec(\Phi-\zeta), h\tan(\Phi-\zeta)\sec(\theta+\gamma)$ $(X3,Y3)=h\tan(\theta-\gamma)\sec(\Phi-\zeta), h\tan(\Phi-\zeta)\sec(\theta-\gamma)$ $(X4,Y4)=h\tan(\theta-\gamma)\sec(\Phi+\zeta) h\tan(\Phi+\zeta)\sec(\theta-\gamma)$ where $\Phi$ and $\theta$ are oblique angles about the corresponding tilt axis i.e. roll and pitch axis.

Thus, by tilting camera about roll axis and pitch axis, a large area can be covered by a high-resolution narrow FOV camera. Notably, overlap of captured images is also minimal as is evident from FIG. 3. But the bi-directional tilting motion of the camera along roll and tilt axes causes the ground area captured to be skewed in two directions. Thus, in order to extract slope of the original object in the image, a bi-directional inverse transformation needs to be performed, which is challenging and operationally intensive.

Case 3: Camera Movement in Combination of Rotation about Pan Axis and a Single Tilt Axis.

Figure 4:
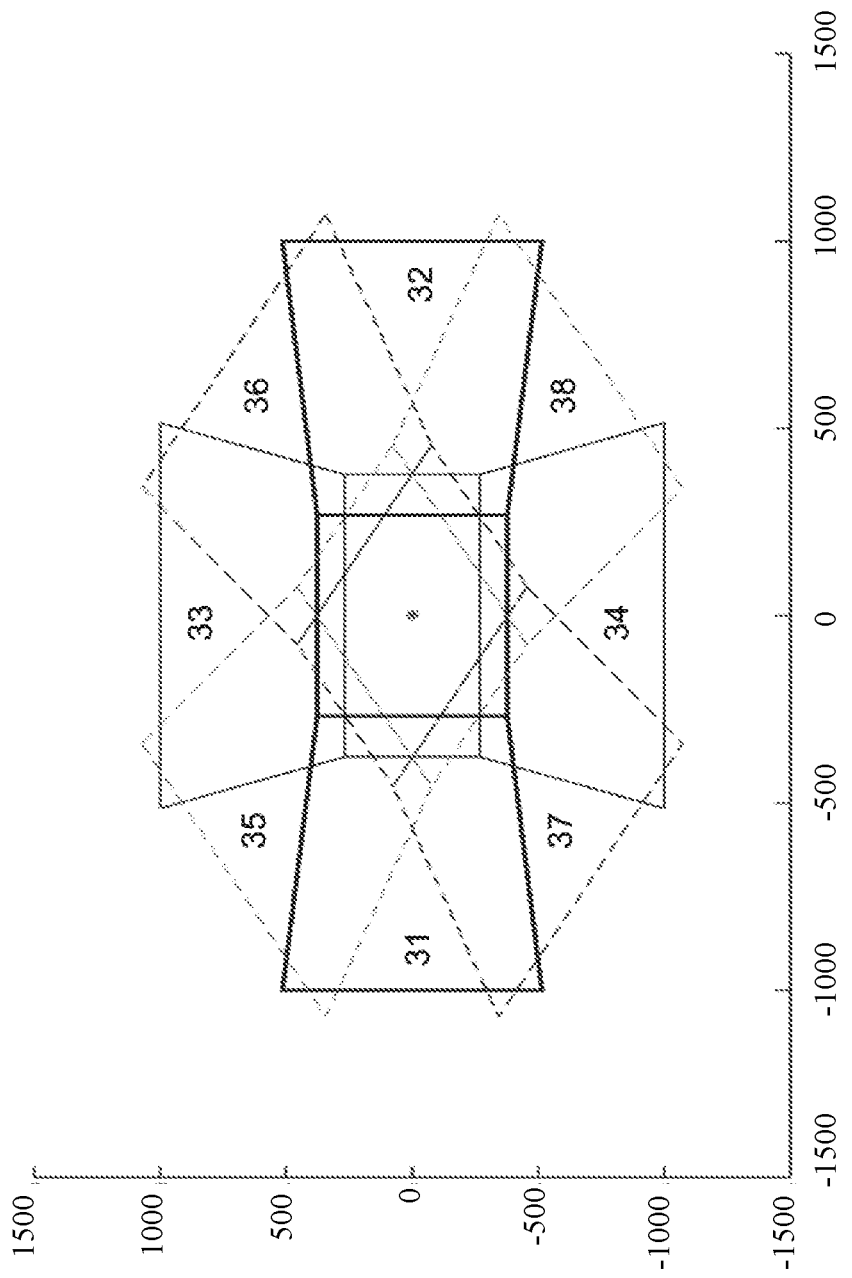
FIG. 4 illustrates ground area covered by a camera by panning and tilting about a single tilt axis.

When camera mechanism is configured to move camera about a single tilt axis and a pan axis, images can be captured along any plan angle by first locating the tilt axis along a desired orientation by panning the camera control mechanism and thereafter tilting the camera to a desired oblique angle. For example, using this configuration oblique images can be captured by orienting the tilt axis along pitch axis of the Aerial Vehicle and tilting the camera backward and forward to capture images along nose to tail direction, and thereafter panning the camera by 90 degrees to similarly capture images along wingspan direction. The exercise of capturing the images can be repeated forother pan angles between −90 degrees and +90 degrees so that complete 360 degrees plan angle coverage at different oblique angles is achieved. As can be seen, since a single tilt axis is used to get oblique perspective—as in case 1, under such operation, rectangular area of FOV of the camera will distort to trapezoids 31, 32, 33, 34, 35, 36, 37 and 38 having only unidirectional distortion as shown in FIG. 4.

It is evident from above that capturing of oblique images along a direction obtained by combination of movements about two tilt axes results in bi-directional distortion of objects in the captured images requiring subsequent bi-directional inverse transformation during image processing, which complicates process of 3D image reconstruction. Thus, if aim of acquiring oblique images by moving a single camera about any two axes (i.e. a combination of pan axis and a tilt axis, or a combination of roll and pitch axes) along with minimized inverse transformation of the oblique images is to be achieved, the method has to depend on capturing oblique images along two perpendicular directions only.

In an aspect, the disclosed method for capturing images using a single camera for 3D reconstruction takes images in oblique perspective by tilting the camera along a single tilt axis i.e. without simultaneous tilting about a second tilt axis. Thus, images can be captured along flight direction and wingspan direction using tilt movement of a single camera about a tilt axis oriented along pitch axis and about a second tilt axis oriented along roll axis, or the same tilt axis reoriented along roll axis direction by pan movement, wherein the camera is moved from its nadir position along one tilt axis at one time. Thus, distortion in the captured oblique images is limited to a single direction requiring minimized inverse transformation of the captured oblique images.

Overlapping images with different oblique perspectives can be captured from number of points where the aerial vehicle can be made stationary (say by hovering) for capturing a set of images in different directions. However, it may happen that the aerial vehicle is not capable of hovering over a single point. In that case, alternatively images can be captured in different directions as the aerial vehicle is moving along the flight path such that the exercise provides overlapping images with different oblique perspectives. To understand the difference between them the two processes are discussed in details as under:

Acquiring Images at Predefined Waypoints (when Aerial Vehicle is Capable of Hovering at a Fixed Point):

In one embodiment, UAVs which incorporate ability to hover are considered and are provided with predefined waypoints considering the desired overlap for image acquisition about any two-axis out of the standard roll, pitch & yaw axis for 3D image construction which may be roll & pitch axis or pitch & yaw axis or roll & yaw axis. Waypoints are specific image points which are situated at a predefined distance from each other and at each of these waypoints along the flight camera can shoot a set of images comprising an image in nadir perspective and plurality of images in different oblique perspectives which can be processed to extract 3D information, and thereafter, stitched together to create the desired 3D image reconstruction of a desired large are of interest.

Figure 5:
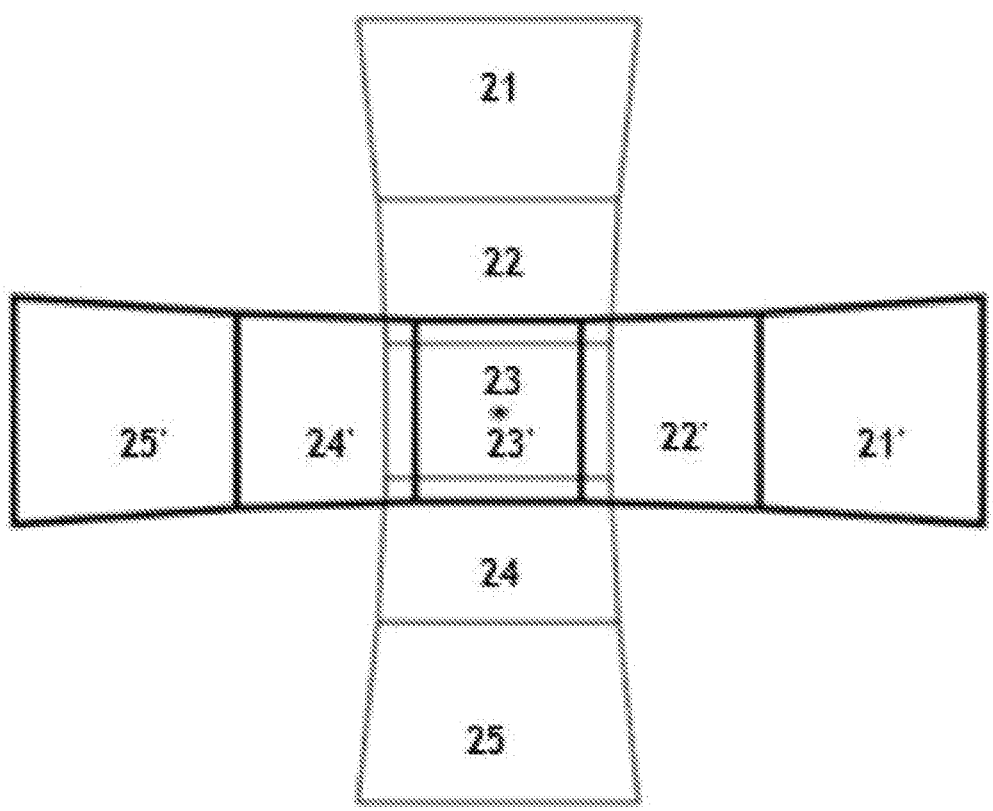
FIG. 5 illustrates ground area covered by a single camera by capturing a set of backward and forward images from a fixed point in 3D space along two perpendicular directions in accordance with an exemplary embodiment of the present disclosure.

FIG. 5 is a schematic illustration of images acquired by a UAV camera along flight direction and along flight-perpendicular direction while hovering in a single waypoint. The UAV can initially click a sequence of images by tilting the camera about pitch axis, for example the camera from its zero position first moves forward along the flight direction of the UAV and clicks images 21, 22, 23, 24 & 25 towards backward and then returns to the zero position. The camera can then pan or the UAV itself can panby 90 degrees to change orientation of the tilt axis to position it along the flight direction, or in an alternate embodiment, second tilt axis that is perpendicular to the first tilt axis and oriented along roll axis/nose to tail direction can be used. After reorienting the tilt axis or by using the second tilt axis, the camera can now be tilted to acquire images along flight perpendicular direction. For example, it can move towards right and clicks images 21', 22', 23', 24'& 25' moving backwards towards left and then returns to zero position.

As is clear from FIG. 5, ground area covered by a set of images captured from a single waypoint shall be cross-shaped (shape of '+'), In an aspect, camera movement can be controlled such that adjacent images have overlapping area to avoid any blind spots/uncovered area. For example 21 can overlap with 22; 22 can overlap with 23; and so on. Likewise, 21' can overlap with 22'; 22' can overlap with 23'; and so on.

Figure 6A:
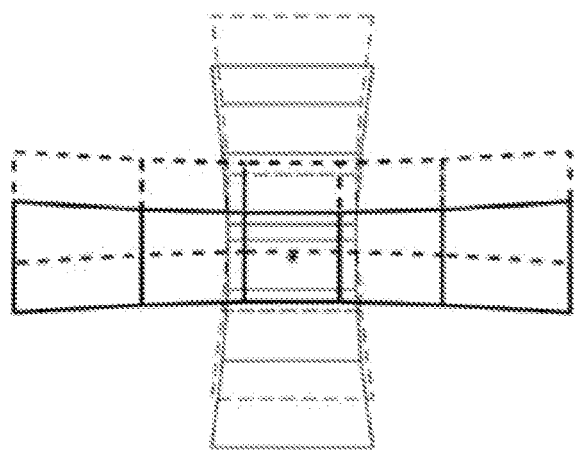
FIGS. 6A, 6B and 6C illustrate schematics of multiple sets of backward and forward images acquired along flight perpendicular direction and flight direction at different waypoints in accordance with an exemplary embodiment of the present disclosure.

In an embodiment, above described process can be repeated at each of the predefined waypoints along the flight path. In an aspect, the waypoints can be chosen such a way that images captured at two adjacent waypoints overlap. Specifically, images captured in flight perpendicular direction should overlap in flight direction so that a there are no blind spots left. FIG. 6A illustrates exemplary representation of two sets of overlapping images captured at two adjacent way points in accordance with above embodiment.

In an embodiment, UAV can be flown along parallel flight paths to cover larger area in lateral direction. Again, distance between adjacent parallel flight paths can be decides so that sets of images captured from adjacent paths overlap.

Figure 6B:
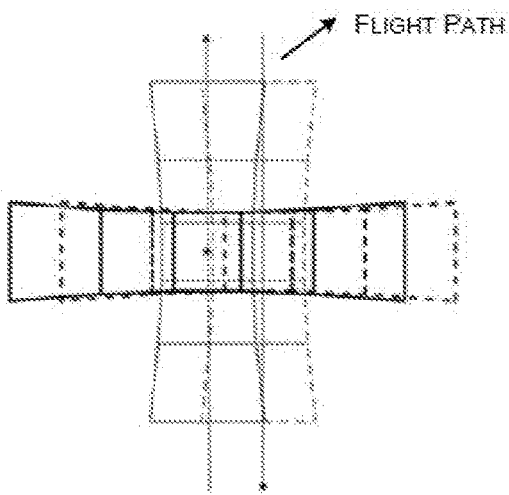
Figure 6C:
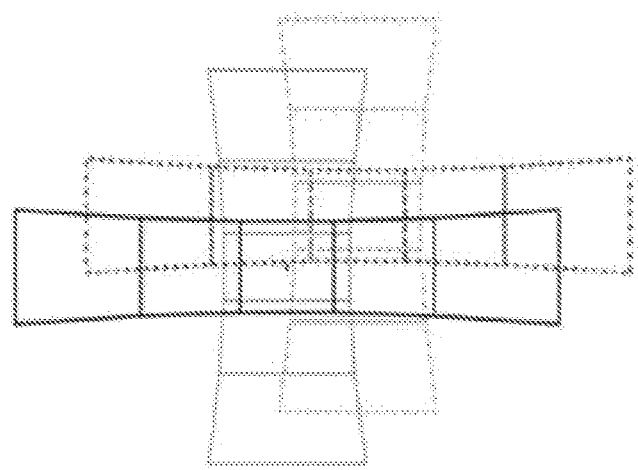

FIGS. 6B and 6C illustrate exemplary representation sets of images captured from two adjacent flight paths for two different sets of waypoints located on adjacent flight paths. FIG. 6B shows a set of two waypoints located laterally on two adjacent flight path to left or right of each other and sets of images captured at these together can provide forward, backward and side view perspective of objects captured in the images. FIG. 6C shows set of two waypoints located diagonally on two adjacent flight path, and sets of images captured at these together can, after 3D reconstruction, provide perspective of objects from directions other than forward, backward and side. By appropriately coordinating multiple flights over the area of interest, it is possible for each point on the ground to be photographed from multiple positions/directions. The whole collection of acquired images can be used to construct a detailed 3D image.

In an aspect, movement of camera about different axes and its triggering to capture images can be programmed variedly. For example, it is possible that images are taken first along the flight perpendicular direction and then in flight direction or vice versa. Likewise it is possible that images are captured from back side to front instead of front to back without compromising capturing of desired amount of details in any manner.

Figure 7A:
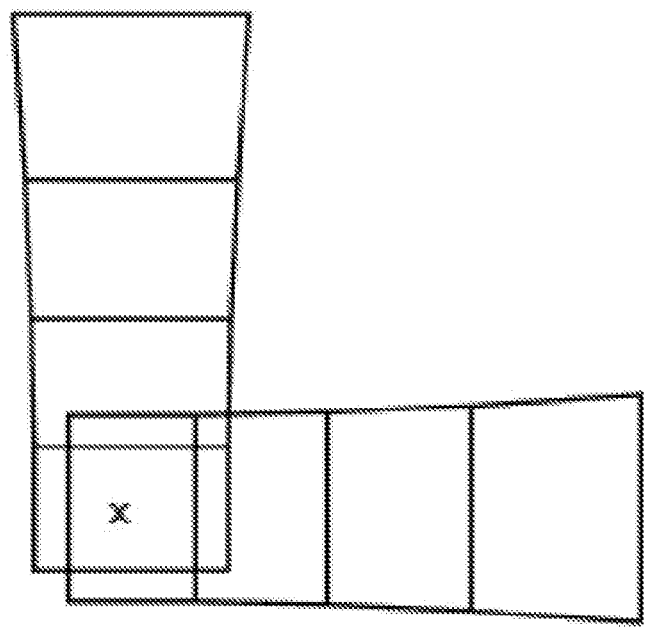
FIGS. 7A and 7B illustrate ground area covered by a single camera by capturing a set of images in the two perpendicular directions on one side only in accordance with an exemplary embodiment of the present disclosure.
Figure 7B:
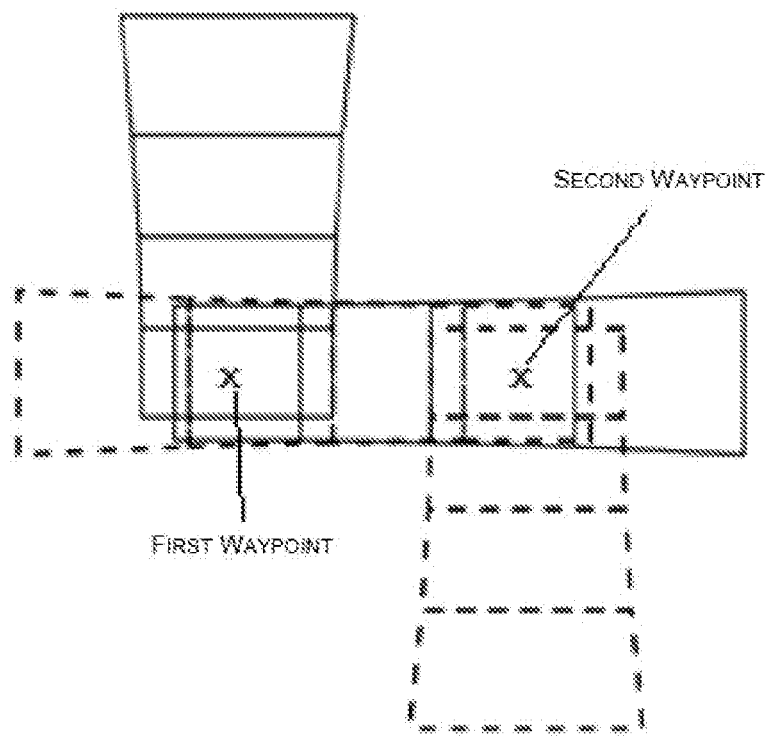

FIGS. 7A and 7B is a schematic illustration of images acquired by a UAV camera in another embodiment for capturing a set of images from a waypoint while hovering at the waypoint. As shown in FIG. 7A a set of images can be captured by moving camera only to one side from its nadir position, i.e. either front side or rear side while capturing images in flight direction, and either front side or rear side while capturing images in flight perpendicular direction. As can be seen ground area covered by the camera in an image capturing sequence in a L-shape. As shown in FIG. 7B, set of images at next way point can be taken in opposite directions i.e. towards rear side during capturing images in flight direction if the images at earlier way point were taken towards front direction; and on left wide during capturing images in flight perpendicular direction if the images at earlier way point were taken towards right side. In an aspect, capturing of images in the L-shape reduces sweep time of the camera, while at the same time capturing images in almost all the perspective and complete ground area as in the + shape but with reduced number of images leading to less post processing requirements.

Figure 8:
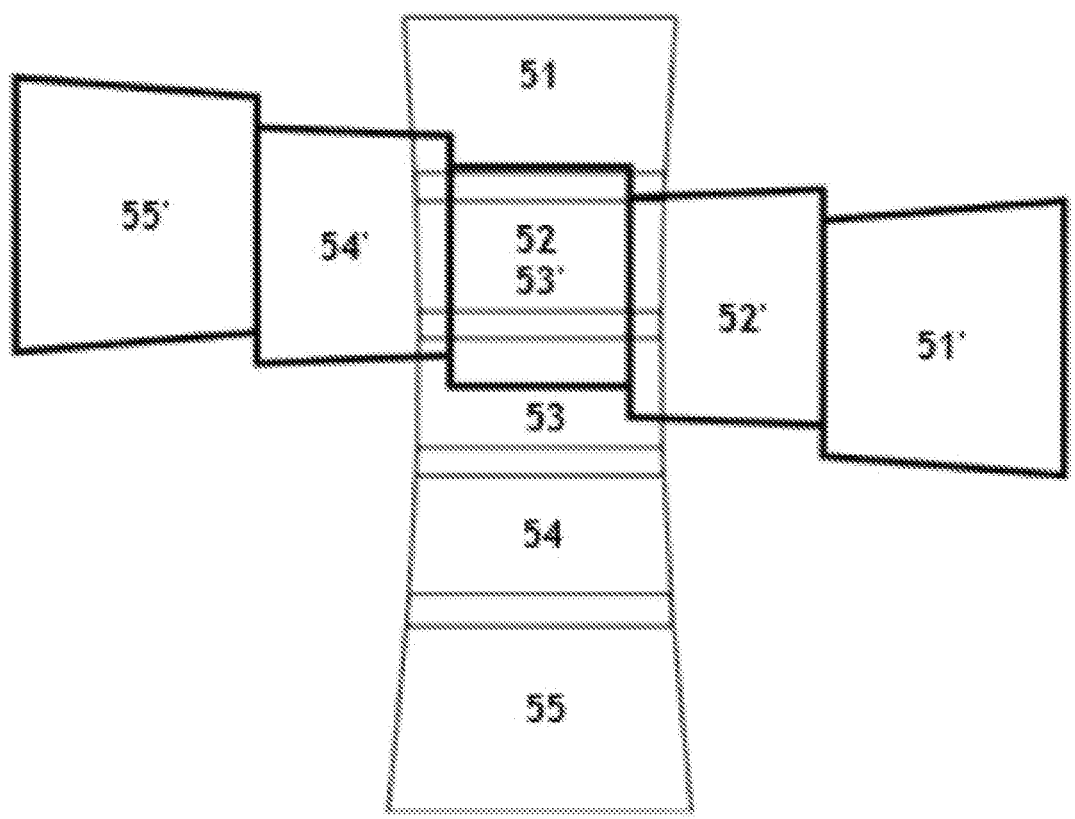
FIG. 8 illustrates ground area covered by a single camera by capturing a set of images during flight in accordance with an exemplary embodiment of the present disclosure.

Acquiring Images while Flying (when Aerial Vehicle is not Capable of Hovering at a Fixed Point):

In one embodiment, UAVs which do not have the ability to hover like fixed-wing UAVs are considered and are provided with a flight path considering the desired overlap for image acquisition about the pitch and yaw axis for 3D image construction. In this method, the UAV camera shoots a set of sequential images along flight direction and flight perpendicular direction in same manner as in case of UAV hovering over a waypoint with difference that the set of images are captured while the Aerial Vehicle is in motion, and repeats the sequence along the path. This produces interim images which can be processed and stitched together to create the desired 3D image reconstruction FIG. 8 illustrates an exemplary representation of area captured in images acquired along flight direction and flight perpendicular direction while flying along a flight path. Aerial Vehicle can initially click a sequence of images by tilting the camera about pitch axis, for example the camera from its zero position can first move forward along the flight direction of the UAV and clicks images 51, 52, 53, 54 & 55 towards backward and then returns to the zero position. The camera can then pan or to change orientation of the tilt axis to position it along the flight direction, or in an alternate embodiment, second tilt axis that is perpendicular to the first tilt axis and oriented along roll axis/nose to tail direction can be used. After reorienting the tilt axis or by using the second tilt axis, the camera can now be tilted to acquire images along flight perpendicular direction. For example, it can move towards right and clicks images 51', 52', 53', 54'& 55' moving backwards towards left and then returns to zero position.

Since the UAV is moving while sequence of images are captured, each subsequent image clicked along flight perpendicular direction shall be displaced in direction of flight as shown in the exemplary illustration in FIG. 8. For same reason, movement of camera while capturing images along flight direction would need to be coordinated with velocity of the Aerial Vehicle to maintain appropriate overlaps.

Figure 9:
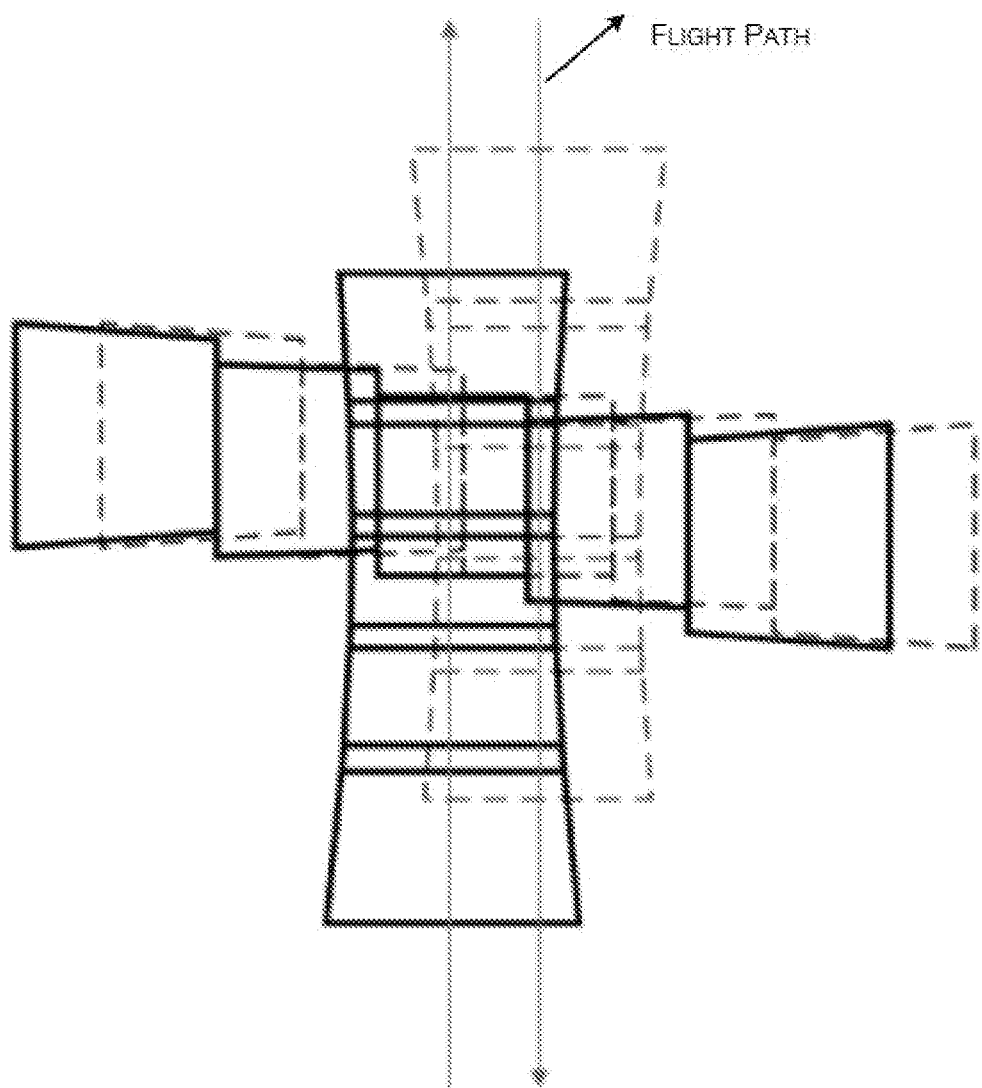
FIG. 9 illustrates schematics of overlapping sets of images acquired during two adjacent flight paths in accordance with an exemplary embodiment of the present disclosure.

FIG. 9 illustrates an exemplary representation of area covered by two different sets of images captured during two adjacent flight paths. The exemplary illustration brings out overlap of images when mapping a single target from two different positions while the Aerial platform is flying/moving. The images that overlap in this way provide oblique views of a target from different directions which is helpful in reconstructing 3D image of the target. Thus, this method acquires images in any arbitrary perspective of the target using any two axes for movement of a single high resolution camera. Since the images are taken at different positions due to the imaging platform being in motion, a desired overlap between sequential images is required to ensure that the coverage remains uncompromised. As can be appreciated, degree of overlap between adjacent images shall depend on how quickly images are taken with respect to the speed of the aircraft over the ground. Taking this into account, a multi paradigm numerical computing environment may be provided for triggering of camera such as by using Mat lab.

Figure 10A:
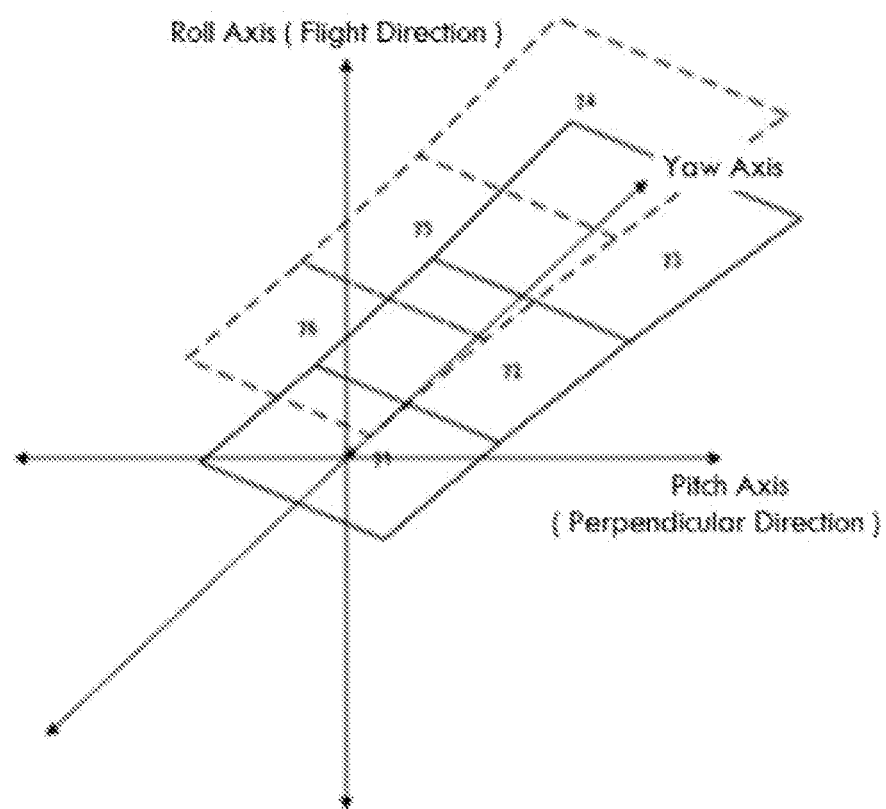
FIG. 10A illustrates schematic of images acquired by a camera along a direction other than flight direction or wingspan direction (i.e. along a plan angle) by combination of camera movement about a pan axis and tilt axis.
Figure 10B:
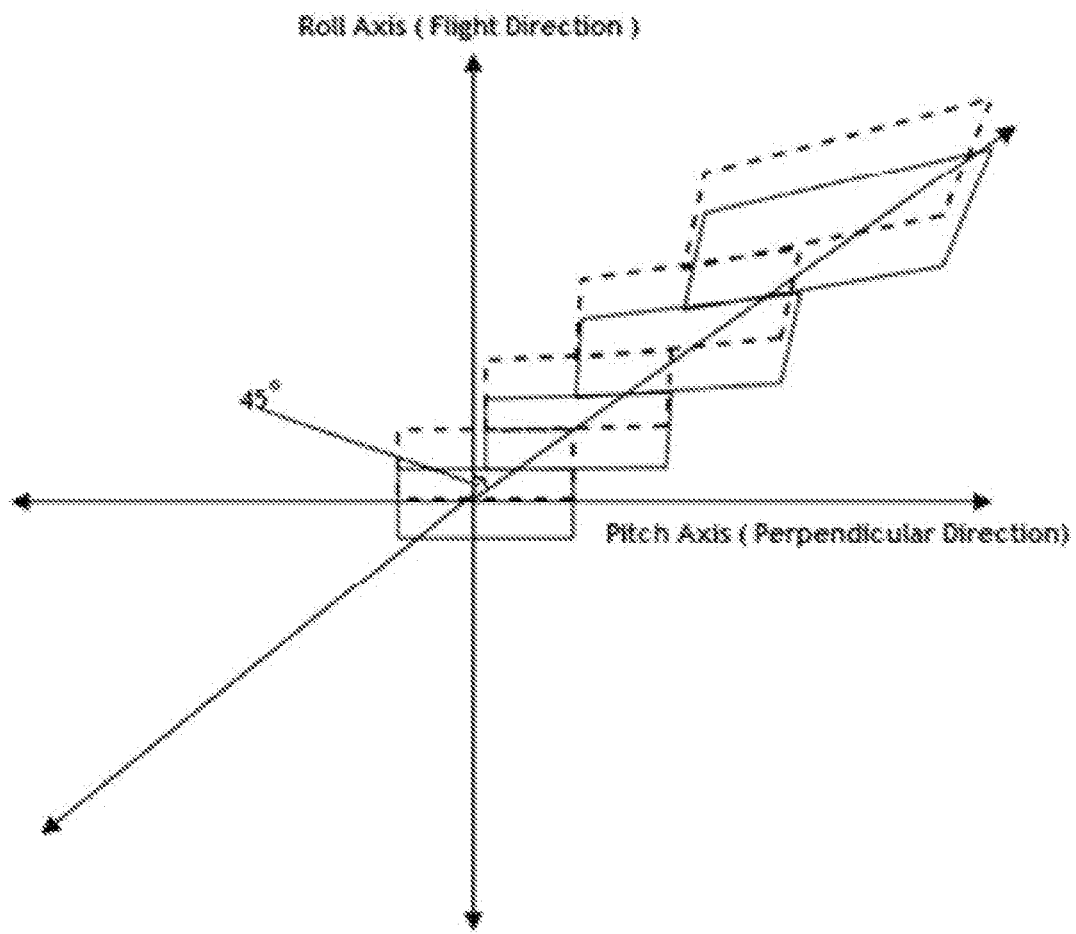
FIG. 10B illustrates schematic of images acquired by a camera along a direction other than flight direction or wingspan direction (i.e. along a plan angle) by combination of camera movement about roll axis and pitch axis.

It is to be appreciated that while various embodiments of the disclosure have been explained showing oblique images of a set of images being captured along flight direction and flight perpendicular direction, however, it is possible to capture oblique images in any two mutually perpendicular directions capturing same amount of information for 3D image reconstruction. FIGS. 10A and 10B illustrate exemplary representation of images acquired from a hovering position at a waypoint along a direction different from flight direction and flight perpendicular direction. The images are clicked either with imaging axis aligned with the image capture sequence as shown in FIG. 10A, i.e. by combination of camera movement about a pan axis and tilt axis; or have the imaging axis aligned with the body axis and not with the image captured sequence as shown in FIG. 10B, i.e. by combination of camera movement about a roll axis and pitch axis. As shown in FIG. 10B, rectangular image area in the oblique images shall be distorted to polygons requiring bi-directional inverse transformation. Whereas, in FIG. 10A rectangular image area in the oblique images shall be distorted to trapezoids requiring only unidirectional inverse transformation.

Figure 11:
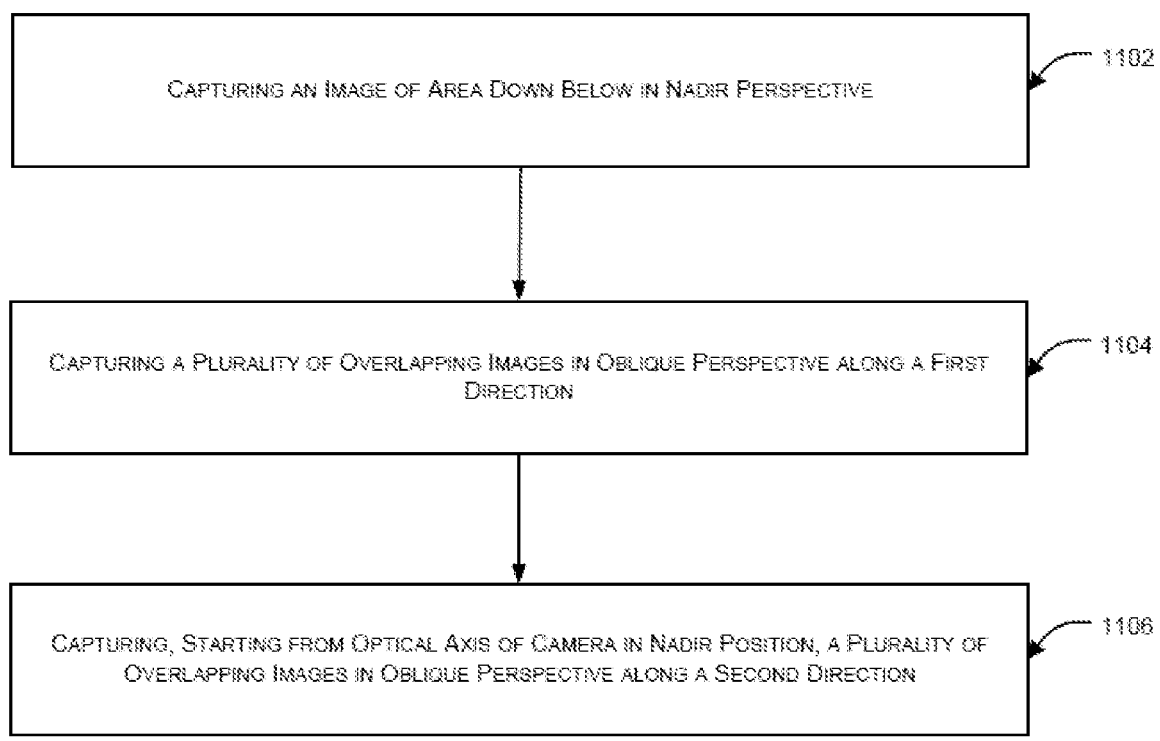
FIG. 11 illustrates an exemplary flow diagram for method for capturing images of a large target area using a single camera mounted on an aerial platform for reconstructing 3D image of the targeted area in accordance with embodiments of the present disclosure.

FIG. 11 illustrates an exemplary flow diagram for method for capturing images of a large target area using a single camera mounted on an aerial platform for reconstructing 3D image of the targeted area in accordance with embodiments of the present disclosure. The method for capturing images of a large target area using a single camera mounted on an aerial platform for reconstructing 3D image of the targeted area can at step 1102 involve capturing an image of area down below in nadir perspective after pointing optical axis of the camera vertically down. Step 1104 can involve capturing a plurality of overlapping images in oblique perspective along a first direction by tilting the camera about a first tilt axis of camera control mechanism; and step 1106 can involve capturing, starting from the optical axis of the camera in nadir position, a plurality of overlapping images in oblique perspective along a second direction, wherein the second direction is a direction perpendicular to the first direction, and the first direction and the second direction define a quadrant of area below the Aerial Vehicle.

In an aspect, for capturing images along the first and second direction, the camera can be tilted about roll axis and pitch axis of camera control mechanism. Alternatively, it can be done using pan axis and a tilt axis of the camera control mechanism. Tilting the camera about a single tilt axis at a time results in images acquired in oblique perspective having only unidirectional distortion.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present disclosure provides an economical and simple to implement method for acquiring high-resolution three-dimensional images of large target area from an aerial platform.

The present disclosure provides a method for acquiring high-resolution three-dimensional images of large target area from an aerial platform using a single camera.

The present disclosure provides a method for acquiring images of large target area with a single camera by moving the camera about any two axes i.e. a combination of pan axis and a tilt axis, or a combination of roll and pitch axes.

The present disclosure provides a method that requires capturing fewer images.

The present disclosure provides a method for capturing oblique images that results in a unidirectional distortion of objects thereby minimizing inverse transformation of the captured images in oblique perspective.

We claim:

1. A method of acquiring a set of images of a target area from an Aerial Vehicle for reconstructing a 3D image for a large area of interest using a single camera, the method comprising:
   capturing an image of area down below in nadir perspective after pointing optical axis of the camera vertically down in nadir position;
   capturing, by tilting the camera about a first tilt axis of the camera, a plurality of first images in oblique perspective along a first direction, said plurality of first images having overlap between the sequential first images;
   bringing the camera back to the nadir position by tilting the camera about the first tilt axis of the camera; and
   capturing, starting from the optical axis of the camera in the nadir position and by tilting the camera about a second tilt axis, a plurality of second images in oblique perspective along a second direction said plurality of second images having overlap between the sequential second images,
   wherein the second direction is perpendicular to the first direction, and the first direction and the second direction define a quadrant of area below the Aerial Vehicle; and
   wherein capturing the plurality of first and second images in oblique perspective by tilting the camera about a single tilt axis starting from the nadir position results in the captured first and second images having only a unidirectional distortion.

2. The method as claimed in claim 1, wherein the first direction and the second direction are nose to tail direction and wing span direction of the Aerial Vehicle, and the plurality of the first and second images in oblique perspective along the first direction and the second direction are obtained by tilting the camera about roll axis and tilt axis of control mechanism of the camera.

3. The method as claimed in claim 1, wherein the second tilt axis is same as the first tilt axis, and wherein the plurality of first images along the first direction are obtained by tilting the camera about the first tilt axis after the first tilt axis has been oriented perpendicular to the first direction, and the plurality of second images along the second direction are obtained by tilting the camera about the first tilt axis after reorienting the first tilt axis in perpendicular direction by moving the camera about a pan axis of the control mechanism, or by yaw movement of the Aerial Vehicle.

4. The method as claimed in claim 1, wherein the camera is a high resolution, narrow field of view camera.

5. The method as claimed in claim 1, wherein the set of images is captured while the aerial Vehicle is hovering at a waypoint out of plurality of waypoints along a flight path.

6. The method as claimed in claim 5, wherein the camera tilts to opposite sides at the alternate waypoints.

7. The method as claimed in claim 1, wherein the set of images is captured while the Aerial Vehicle is moving along a flight path.

8. The method as claimed in claim 7, wherein the camera movement is controlled using a multi paradigm numerical computing environment to ensure adequate overlap of the captured images.

* * * * *